Nov. 28, 1950 P. H. EVE 2,531,562
FLOATING SUPPORT FOR GROWING PLANTS
Filed Sept. 27, 1948
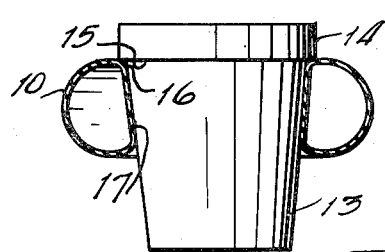
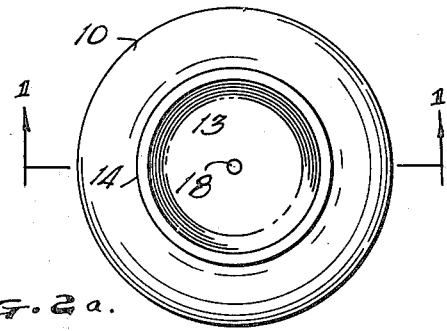
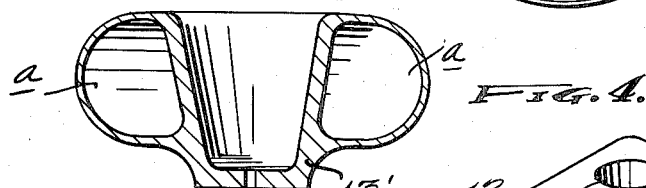
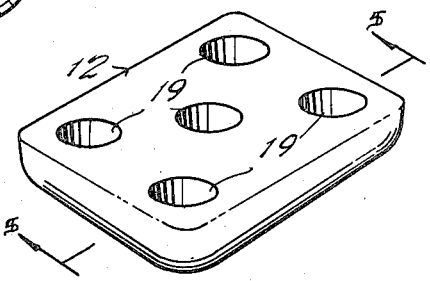
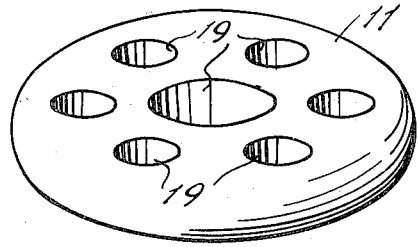
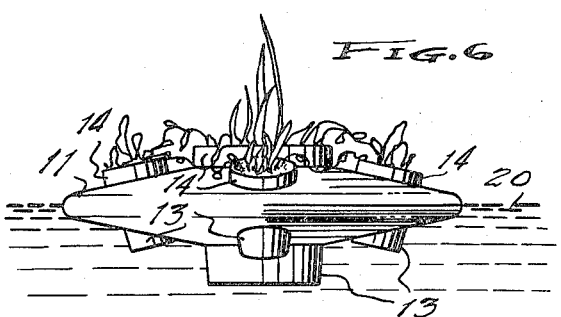
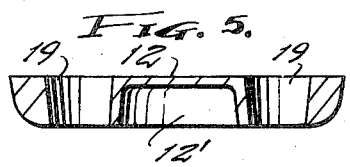
PHILIP H. EVE
INVENTOR.
BY Cecil L. Wood
ATTORNEY Patented Nov. 28, 1950

2,531,562

UNITED STATES PATENT OFFICE 2,531,562

FLOATING SUPPORT FOR GROWING PLANTS

Philip H. Eve, Fort Worth, Tex.

Application September 27, 1948, Serial No. 51,357

1 Claim. (Cl. 47—41)

This invention relates to buoys for floral plants, and other decorative vegetation, and it has particular reference to a floating support or raft formed with one or more receptacles for conventional types of pots for such purposes, and its principal object resides in the provision of an economical device by which decorative floral arrangements can be placed in outdoor or indoor pools, or located on small lakes and ponds.

It is an object of the invention to provide an arrangement of the character described by constructing or forming the buoy in any of several shapes and dimensions from materials having a tendency to buoyancy, or by employing pneumatically inflated structures composed of rubber or plastics, and it is contemplated that the device may comprise hollow metal structures, such as aluminum or stainless steel, sealed to provide buoyancy on water, and may even comprise structures of suitable materials having air pockets to cause the device to float and having sufficient buoyancy to support the weight of a number of pots or containers having plants therein with the added weight of potting soils which may be employed, and provide one or a plurality of receptacles through the device for supporting the said pots in their normal positions.

Broadly, the invention contemplates the provision of a device for maintaining various types of growing plants on water surfaces, thus enhancing the beauty of the landscape by the addition of the variety of shapes and designs of the floral arrangements made possible by the invention, and providing means for constantly supplying moisture to the plants.

While the foregoing objects are paramount, other and lesser objects will become manifest as the description proceeds, taken in connection with the appended drawings wherein:

Figure 1 illustrates one form of the invention in transverse section, on lines 1—1 of Figure 2, a conventional plant pot being shown in elevation supported by the invention.

Figure 2 is a plan view of the circular form of the invention.

Figure 2a illustrates, in vertical section, a specially designed plant pot or container embodying the invention, being formed with a sealed air chamber embracing the same.

Figure 3 is a perspective view of a modified form of the invention having a plurality of different size receptacles therein.

Figure 4 is a perspective view of another form of the invention having a plurality of receptacles arranged therein.

Figure 5 is a cross-sectional view, taken on lines 5—5 of Figure 4, illustrating the tapered form of the receptacles, and Figure 6 illustrates the invention in operation having a relatively large central pot therein surrounded by a plurality of smaller pots, each containing growing plants.

Accordingly, the invention may be formed in hollow rubber or plastic rings 10, capable of being inflated and being adapted to float, as in the structure shown in Figures 1 and 2, or formed in circular or rectangular bodies 11 and 12, illustrated in Figures 3, 4 and 5, of buoyant materials such as cork, light wood, and other suitable materials, and treated to repel moisture, or formed of plastics and having cavities or recesses 12' formed in their lower sides, as illustrated in Figure 5. Preferably, however, light hollow structures of rust-proof and non-corrosive metals or plastics may be employed. Such an arrangement may be exemplified in the structure shown in Figure 6 and obviously may be of any desired form.

In the form of the invention shown in Figures 1 and 2 a single pot 13, of the conventional type, is supported by its collar 14 which defines a shoulder 15 around its rim. The shoulder 15 engages the upper rim 16 of the circular receptacle 17 which is preferably tapered to conform to the usual tapered form of the conventional pot 13. An aperture 18 is provided in the bottom of the conventional pot 13 through which the plant therein can receive its required moisture from the pool in which the invention is located. A porous material such as moss, sponge rubber, relatively fine mesh screen, and other devices, may be placed in the bottom of the pots 13 to prevent the dissipation of the potting soil contained therein through the aperture 18, or the pots 13 can be especially constructed of a porous material capable of admitting moisture to the soil contents.

While it is desirable to afford a device conforming as nearly as possible to standard potting facilities, such as the use of the conventional type of pot 13 illustrated in Figures 1 and 2, and employed in the structure shown in Figure 6, it is also an object of the invention to provide a specially designed container 13' which can be formed of plastic or ceramics and having integral sealed compartments a which obviously can embrace the upper portion of the container or pot 13', as illustrated in Figure 2a so that such pot can be used as a single unit. A group of such pots, however, may also be formed into a single unit, as previously pointed out in reference to the modification of the structure shown in Figure 6.

In other forms of the invention, as illustrated in Figures 3, 4 and 5, any number of receptacles 19 may be provided having different diameters and capable of receiving pots 13 in various groupings, as by placing a relatively large pot 13 in the center of the body 11 or 12 and arranging a number of smaller pots 13 therearound to obtain the effect shown in Figure 6. It is contemplated that the lower ends of the pots 13 will project below the supporting bodies 11 and 12 into the water 20 of the pool. By forming the body 11 or 13 with a cavity 12' in the bottom or lower side thereof, as shown in Figure 5, the invention can be made buoyant when formed of plastic, or other similar materials. The cavity 12' serves as a pocket to trap the air, and although the body may be solid otherwise, the device is caused to float and support a number of pots.

Obviously there are certain types of plants that cannot flourish when subjected to a constant water supply, particularly most species of cacti, and many other plants, but there are many varieties of water plants, as well as the dry land varieties, which are suited to be arranged in the device and subjected to the constant supply of moisture afforded by their contact with the water 20.

It is also contemplated that the invention may be embellished with ornate marine designs, if desired, which can be arranged about the receptacles 19. Such devices, which are not illustrated, can be attached to the bodies 11 or 12 or formed therewith according to the individual requirements. Means can be afforded for anchoring the device, such as by the use of a cable, or the like.

Manifestly, the structure herein shown and described is capable of considerable modifications from time to time, by persons skilled in the art, without departing from the spirit and intent of the invention or the scope of the appended claims.

What is claimed is:

In a floral buoy for supporting containers for growing plants in pools, in combination, a buoyant body adapted to float on the surface of water and formed with a plurality of normally vertical bores extending therethrough to receive said plant containers, and whereby the said containers extend through said bores and project into the water below said buoyant body while being supported thereby.

PHILIP H. EVE.

REFERENCES CITED

The following references are of record in the file of this patent:

UNITED STATES PATENTS

| Number | Name | Date |
| --- | --- | --- |
| 258,389 | Drew | May 23, 1882 |
| 485,417 | Lord | Nov. 1, 1892 |
| 781,414 | Garnsey | Jan. 31, 1905 |
| 1,689,954 | Marx | Oct. 30, 1928 |

FOREIGN PATENTS

| Number | Country | Date |
| --- | --- | --- |
| 22,575 | Great Britain | Nov. 24, 1893 |